(No Model.) 2 Sheets—Sheet 1.
A. G. BILLINGS.
AUTOMATIC BRAKE.
No. 489,452. Patented Jan. 10, 1893.
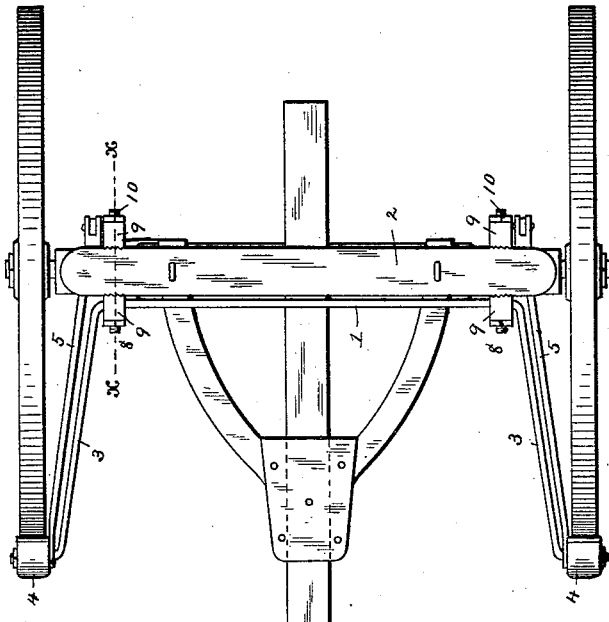
FIG. 1.
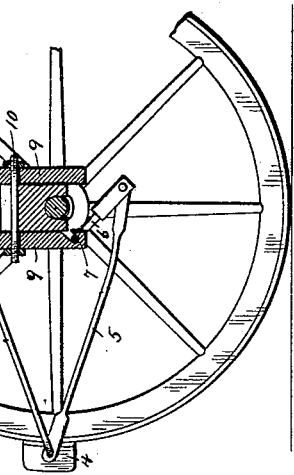
FIG. 6.
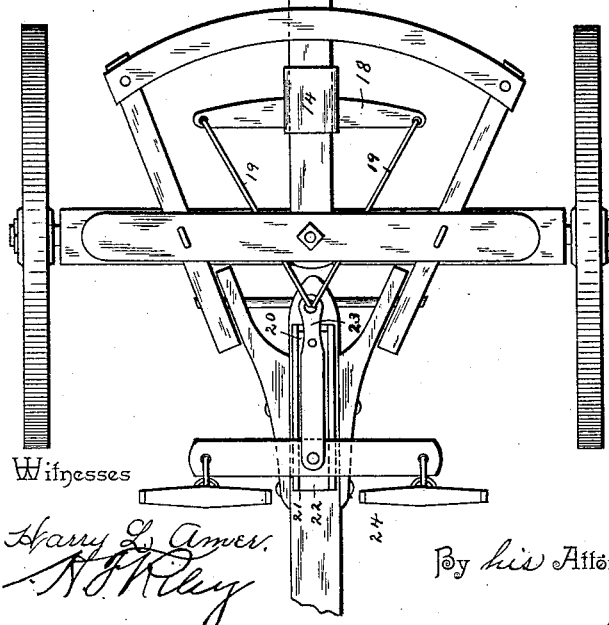
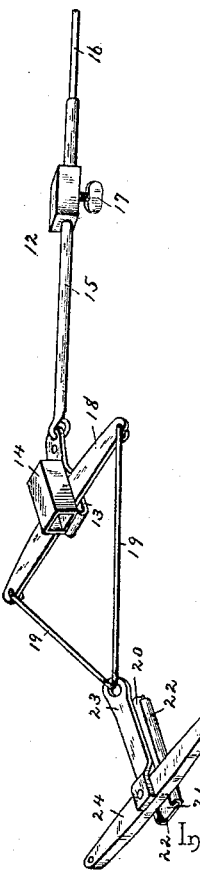
FIG. 5.
Witnesses
Harry L. Amer.
N. J. Riley
By his Attorneys,
C. A. Snow & Co.
Inventor
A. G. Billings.
THE NORRIS PETERS CO., PHOTO-LITHO., WASHINGTON, D. C.

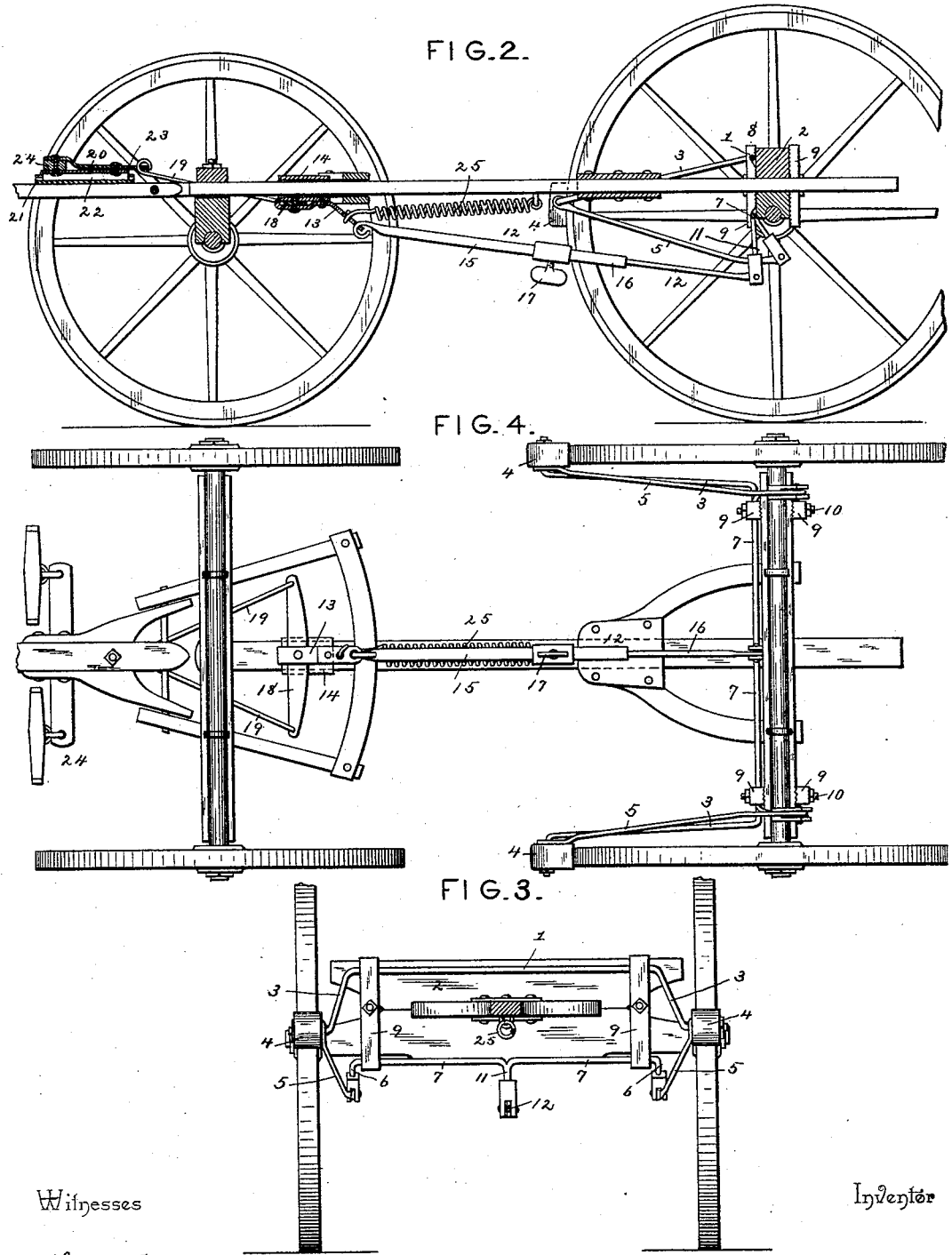

UNITED STATES PATENT OFFICE.

ALVAH G. BILLINGS, OF LAKE PARK, WASHINGTON, ASSIGNOR OF TWO-THIRDS TO GEORGE W. FRITZ AND CHARLES A. GROW, OF SAME PLACE.

AUTOMATIC BRAKE.

SPECIFICATION forming part of Letters Patent No. 489,452, dated January 10, 1893.

Application filed March 31, 1892. Serial No. 427,249. (No model.)

*To all whom it may concern:*

Be it known that I, ALVAH G. BILLINGS, a citizen of the United States, residing at Lake Park, in the county of Pierce and State of Washington, have invented a new and useful Automatic Brake, of which the following is a specification.

The invention relates to improvements in automatic brakes.

The object of the present invention is to simplify and improve the construction of automatic brakes, and to provide one in which when a vehicle is backing the brake shoes will be automatically thrown off the wheels.

The invention consists in the construction and novel combination and arrangement of parts, hereinafter fully described, illustrated in the accompanying drawings and pointed out in the claims hereto appended.

In the drawings—Figure 1 is a plan view of a wagon brake constructed in accordance with this invention. Fig. 2 is a vertical longitudinal sectional view. Fig. 3 is a transverse sectional view on line $y, y$ of Fig. 1. Fig. 4 is a reverse plan view. Fig. 5 is a detail perspective view of the slide, the sleeve and the connecting rod. Fig. 6 is a vertical sectional view on line $x, x$ of Fig. 1.

Like numerals of reference indicate corresponding parts in all the figures of the drawings.

1 designates a brake shaft mounted on the rear bolster 2 of a running gear, and provided at its end with integral arms 3, the outer ends of which are bent outward and carry brake shoes 4, and are connected by lifting rods 5 with outer arms 6 of a rock shaft 7. The brake and rock shafts are journaled in bearings of clips 8, which are mounted on the rear axle and the bolster 2 thereof, and which are composed of vertical bars 9 and connecting bolts 10, the inner faces of the bars being serrated or roughened to prevent them accidentally slipping from the rear axle and the bolster. The rock shaft is provided with the said outer arms 6 and an intermediate arm 11, which arms depend from the running gear and are bifurcated; the outer arms are pivotally connected to the lower ends of the lifting rods 5; and the intermediate arm is pivoted to the rear end of a connecting or draft rod 12, which is adjustable. The adjustable connecting rod has its front attached by means of a hook to a rearwardly projecting keeper plate 13 of a sleeve 14, which is arranged on the reach; and the connecting rod is composed of a tubular member 15, and a rod 16, which telescopes into the tubular member and which is secured in its adjustment by a set screw 17. The slide has pivoted to its lower face a transverse bar 18, which is arranged in the keeper of the sleeve, and which is connected by converging rods 19 with a slide 20, arranged in ways 21 of a plate 22 secured on the upper face of the tongue. The plate 22 is bolted to the tongue and the ways are formed by bending the longitudinal edges upward, and the longitudinal edges of the slide are bent downward and outward to engage the ways. A strap 23 is secured to the slide and is provided at its rear end with an eye into which the front meeting ends of the converging rods are hooked; and between the front end of the strap and the slide is pivoted the doubletree 24.

The brake shoes 4 are held against the wheels when there is no draft upon the connecting rod, by means of a spiral spring 25 having its rear end secured to the reach and its front end connected with the sleeve; but the draft animal, when the vehicle is being started and when in motion, draws the connecting rod forward against the action of the spring thereby turning the rock shaft and moving the arms of the brake shaft upward and carrying the brake shoes outward. As soon as the draft upon the connecting rod ceases the spring draws the connecting rod rearward carrying the brake shoes in engagement with the wheel. The brake shoes are arranged approximately in the same horizontal plane as the axle and engage the wheels at the middle thereof; but, in backing the vehicle the rotation of the wheels is reversed, thereby carrying the brake shoes upward and freeing the wheels. Any downward movement of the brake shoes will draw them inward and cause them to clamp the wheels. The plate which is provided with ways and which receives the slide and which is bolted to the tongue may be readily removed to enable the doubletree to be pivoted to the tongue in the usual manner; and the entire brake mechanism may be readily applied to an ordinary vehicle without altering the construction thereof.

From the foregoing description and the accompanying drawings, the construction, operation and advantages of the invention will be readily understood.

I wish it understood that in all matters of form, size proportion and details of construction I wish to exercise the right to make such changes as may fairly fall within the scope of my invention.

What I claim is—

1. The combination with a running gear, of a brake shaft journaled thereon and arranged adjacent to the rear bolster and provided with forwardly extending arms carrying brake shoes, a rock shaft journaled on the running gear and located below the brake shaft and provided at its ends with arms and having an intermediate arm, the lifting rods connecting the outer arms of the rock shaft with the arms of the brake shaft, and means for connecting the intermediate arm with draft animals, substantially as described.

2. The combination with a running gear, of clips arranged on the rear axle and bolster and provided with bearings and composed of vertical bars having their inner faces roughened and bolts connecting the bars and causing the same to clamp the axle and bolster, a brake shaft journaled on the clips and provided with arms carrying brake shoes, a rock shaft journaled on the clips and provided at its ends with arms connected with those of the brake shaft and having an intermediate arm, and means for connecting the latter with draft animals, substantially as described.

3. The combination with the running gear, of a brake shaft journaled thereon and arranged adjacent to the rear bolster and having arms carrying brake shoes, a rock shaft journaled on the running gear and arranged below the brake shaft, and having end arms connected with those of the brake shaft and having an intermediate arm, a sleeve mounted on the reach and connected with the intermediate arm of the rock shaft, a spring arranged to draw the sleeve rearwardly to hold the brake shoes in engagement with the wheels, and a slide carrying the doubletree and connected with the sleeve, substantially as described.

4. The combination with a running gear, of a brake shaft journaled thereon and having arms carrying brake shoes, a sleeve mounted on the reach and connected with the arms of the brake shaft, a spring adapted to carry the sleeve rearwardly, a transverse bar pivoted to the sleeve, a slide mounted on the tongue and carrying the doubletree and converging rods connecting the transverse bar with the slide, substantially as described.

5. The combination with a running gear, of a brake shaft journaled thereon and carrying brake shoes, a sleeve mounted on the reach and connected with the brake shaft, a transverse bar pivoted to the sleeve, a spring connected with the sleeve and adapted to carry the same rearward, a plate mounted on the tongue and provided with ways, a slide arranged in said ways, a strap secured to the slide and provided at its rear end with an eye, converging rods connected to the ends of the transverse bar and the eye of the strap, and a doubletree pivoted between the strap and the slide, substantially as described.

In testimony that I claim the foregoing as my own I have hereto affixed my signature in presence of two witnesses.

ALVAH G. BILLINGS.

Witnesses:
 CHARLES LA BRECHE,
 WM. NIESEN.